United States Patent
Tarnavsky et al.

[11] 3,811,178
[45] May 21, 1974

[54] METHOD FOR THE MANUFACTURE OF CORED WIRE

[76] Inventors: Abram Lvovich Tarnavsky, ulitsa Mayakovskogo, 21-a, kv. 87; Nail Khabibrakhmanovich Goloveev, prospekt Lenina, 1, kv. 101, both of Magnitogorsk, U.S.S.R.

[22] Filed: Apr. 8, 1971

[21] Appl. No.: 132,540

[52] U.S. Cl. ............... 29/517, 57/146, 138/151
[51] Int. Cl. ............... B21d 39/00, B23p 11/00
[58] Field of Search ............ 29/456, 517; 138/151; 57/146

[56] References Cited
UNITED STATES PATENTS

| | | | |
|---|---|---|---|
| 2,215,477 | 9/1940 | Pipkin | 29/517 UX |
| 2,308,669 | 1/1943 | Beed | 29/517 UX |
| 2,644,353 | 7/1943 | McLaughlin | 29/517 X |
| 2,830,363 | 4/1958 | Reiter | 29/517 |
| 3,237,477 | 3/1966 | Matz | 29/517 X |

*Primary Examiner*—Charlie T. Moon
*Attorney, Agent, or Firm*—Holman & Stern

[57] ABSTRACT

A method of manufacturing cored wire using materials of different plasticity for the core and its surrounding wire, in which blanks which are to be drawn are produced in the process, the blanks being formed of an outer tubular sheath of the material of which the surrounding wire is to be formed, and a coaxially placed elongated center core in the form of a helical core member; the method is characterised in that the helical core outer diameter-to-tubular sheath internal diameter ratio is not greater than 1:3.

7 Claims, 13 Drawing Figures

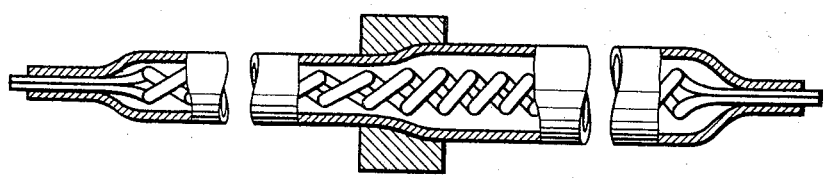
FIG. 1
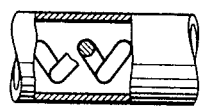 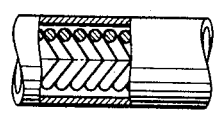 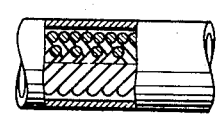
FIG. 2  FIG. 6  FIG. 10
  
FIG. 3  FIG. 7  FIG. 11
 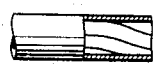 
FIG. 4  FIG. 8  FIG. 12
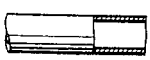  
FIG. 5  FIG. 9  FIG. 13

METHOD FOR THE MANUFACTURE OF CORED WIRE

This invention relates to methods of wire drawing and, more particularly, to methods for the manufacture of cored wire by drawing a blank consisting of a tubular sheath and a core.

It is known in the art to manufacture cored wire by drawing a blank which consists of a tube and a ore in the form of a straight solid wire.

This known method is useful only where both the tube and core are made from plastic materials having more or less identical plasticity characteristics.

The term "plastic" is used in this specification to denote the degree of softness and the degree of workability of the material in wire-drawing operations.

In the fields of instrumentation and rocketry, there has arisen of late the necessity of employing cored wires in which the core is made from a material that is non-plastic under standard conditions, while the sheath is built up by a relatively plastic material, an exemplary cored wire of this type being a wire in which the ore is made of molybdenum, whereas the sheath consists of a relatively plastic heat-resisting alloy.

The known method is unsuited for manufacturing this type of cored wire, for, the process of drawing the blank is accompanied by core rupture and also by pulling off of the sheath.

Attempts have been made to develop a method of cored wire drawing wherein, in order to use a plastic material in conjunction with a non-plastic material, the blank being drawn comprises a tube with a core inserted thereto, and the core consists of an elongated rod having a dimensional helix wound thereto. Said method is likewise ineffective, insofar as the dimensional helix, in the course of wire drawing, either pierces the tube or undergoes rupture owing to the insufficiency of free space for straightening the helix during the process of blank drawing.

It is an object of the present invention to eliminate the aforementioned disadvantages.

To the accomplishment of this end, there is provided a method of manufacturing cored wire comprising providing a tube and accommodating a core in the form of a dimensional helix in the tube to form a blank, the blank then being drawn with the ends of said helix being affixed to said tube, wherein, according to the invention, the helical core and the tube are selected so that the core outer diameter-to-tube internal diameter ratio does not exceed 1:3.

The ends of the helix are affixed to the tube ends by rolling-in, welding-on or in some other way securely affixing the ends of the helix against their displacement along the axis of the tube.

The present invention is described in detail hereinbelow with reference to the attached drawings and illustrated by exemplary embodiments thereof.

FIG. 1 shows the method of drawing tubes with an inserted two-wire helix.

FIGS. 2, 6 and 10 show three possible initial blanks with different cores in each.

FIGS. 3, 7 and 11 show the first step in the drawing process of blanks according to FIGS. 2, 6 and 10.

FIGS. 4, 8 and 12 show a second possible step in the drawing process.

FIGS. 5, 9 and 13 show a further possible step in the drawing process.

To obtain the desired blank which is further drawn to produce the required cored wire, an elongated helix of a relatively nonplastic material may be inserted into a tube made of a relatively plastic material; a second variant is to obtain a blank by inserting an elongated helix of a relatively plastic material into a tube made of a relatively plastic material.

The ends of the helix are firmly affixed to the tube ends. In the blank, use is made of a tube and a helix for which the helix outer diameter-to-tube internal diameter ratio is not greater than 1:3, no specific restrictions being imposed on the lower limit of said ratio.

The resultant blank is subjected to drawing by conventional procedures.

During the process of drawing the blank whose helical core is made from a plastic material, there occurs initially tube reduction by the action of drawing accompanied by simultaneous straightening of the helix, followed by reducing jointly the tube and the straightened helix.

The extent of reduction during the process of drawing is to be such that during the first step of working (FIGS. 3, 7 and 11) only the helix is straightened and is reduced in diameter while the diameter of the wire remains unchanged. When the helix is made of plastic wire, the drawing process can continue and the wire reduced as is shown in FIGS. 4, 5, 8, 9, 12 and 13. Depending on the composition of components and on the diameter of the product to be obtained, the process terminates either at the first step (FIGS. 3, 7, 11), or at the second step (FIGS. 4, 8, 12) or at the third step (FIGS. 5, 9, 13). However, the principal distinguishing feature of the method being proposed is the first step, i.e., drawing without reduction in diameter of the helix wire. As may be seen from FIG. 1, the drawing results in reduction in the diameter of the tube and the helix and in their corresponding elongation. If the helix consists of a single wire (FIG. 2), the first step terminates when a cylindrical composite structure consisting of a straightened wire (core) and a tubular sheath is obtained (FIGS. from 3 to 5). The first step in all the embodiments can be accomplished in one or several draws depending on the dimensions of the finished product. When the helix consists of several wires of similar or different materials (FIG. 6), the first step terminates in winding the wire of the helix into a strand (FIG. 7) and in obtaining a product consisting of a wound core and a tubular sheath. When required, the obtained blank (FIG. 7) is drawn further to turn the strand into a monolith (Step II, FIG. 8) and to make the product thinner (Step III, FIG. 9). The method permits also the use of a double strand or a multiple strand helix (FIG. 10) consisting of wires of similar or different materials. The method of turning a multiple blank (FIG. 10) into a commercial product is shown in FIGS. 11 to 13. Because of the fact that the helix diameter-to-tube diameter ratio is selected to meet the requirements set forth hereinabove, the core will be straightened completely when there commences the step of drawing jointly the tube and the core, whereby the phenomenon of tube piercing by the core is eliminated.

To pre-fabricate blanks, use may be made of either a single or a multiple helix, i.e. of a helix consisting of a single strand or a plurality of strands.

Where the core of the blank is made from a relatively non-plastic material, the process of cored wire drawing may be terminated at the step of helical core straightening.

Specific examples of cored wire manufacture according to the invention are given below.

EXAMPLE 1

The procedure described hereinbelow is directed to the manufacture of steel-aluminum wire having the following characteristics: length, 1,000 m; diameter, 0.2 mm; resistivity, 1 ohm/m; breaking strength, 2 kg.

To prepare a blank, use is made of an aluminum tube 4,500 mm long (outer diameter, 5.44 mm; wall thickness, 0.373 mm) and a dimensional helix made from steel wire (carbon content, 0.62%) 0.474 mm in dia., the helical core being 4.500 mm long and 1.474 mm in outer dia. Drawing the blank yielded the cored wire having the desired characteristics.

The cored wire is found to be of continuous cross-section free of irregularities in both the outer aluminum layer and the steel core.

NOTE: In the blank, the core outer diameter-to-tube internal diameter ratio equals about 1:3.

EXAMPLE 2

The procedure disclosed hereinbelow is directed to the manufacture of tungsten wire having a protective heat-resisting sheath.

To prepare a blank, use was made of a stainless steel tube (18 % Cr and 9 % Ni) having an outer diameter of 13.2 mm and a wall thickness of 0.6 mm, and a multiple four-strand helix (outer diameter, 3.8 mm) built up by 0.3 mm tungsten filaments.

Blank drawing yielded a cored wire 1.9 mm in dia. having a wound core. No sheath discontinuity or core wire rupture was observed.

NOTE: In the blank, the core outer diameter-to-tube internal diameter ratio is substantially less than 1:3.

EXAMPLE 3

The procedure disclosed hereinbelow is directed to the manufacture of armored wire.

To prepare a blank, use was made of an iron tube (outer diameter, 10 mm; wall thickness, 1 mm) and a multiple four-strand helix 2.3 mm in outer diameter, the helix being built up by insulated copper wire (insulated wire diameter, 0.31mm).

Blank drawing yielded the sought-for armored wire free from armor defects, or core wire and insulation ruptures.

NOTE: In the blank, the core outer diameter-to-tube internal diameter ratio is substantially less than 1:3.

EXAMPLE 4

The following procedure is intended for the manufacture of armored high-strength wire.

To prepare a blank, use was made of an iron tube having an outer diameter of 10 mm and a wall thickness of 1 mm, and a multiple four-strand helix built up by two insulated copper wires and two steel wires (breaking strength, 360 kg/mm$^2$). The helical core has an outer diameter of 2.1 mm, while the wires used are 0.31 mm in dia.

Blank drawing yielded the sought-for armored wire 3.3 mm in dia., which is free from sheath defects, copper wire insulation failures, or core steel and copper wire ruptures.

NOTE: In the blank, the core outer diameter-to-tube internal diameter ratio equals 1:4.3, i.e., substantially less than 1:3.

In embodying the present method, no restrictions are imposed on the lower limit of the core outer diameter-to-tube internal diameter ratio, lower values of said ratio being conducive to accomplishing the objects of the present invention.

We claim:

1. A method of manufacturing cored wire, said method comprising the steps of:
   forming a wire helix;
   inserting the helix into a tube;
   affixing the ends of the helix to the ends of the tube so as to prevent a relative displacement of the helix within the tube; and
   drawing the thus obtained composite blank until the helix is straightened and transformed into an elongated wire.

2. A method of manufacturing cored wire as defined in claim 1, wherein the ratio of the outer diameter of the helix to the inner diameter of the tube is selected so as not to exceed 1:3.

3. A method of manufacturing a cored wire, as defined in claim 1, wherein the drawing of the tubular composite blank and the helix inserted therein is carried out successively through dies so as to reduce the diameter of the tube and elongate the tube and the helix.

4. A method of manufacturing a cored wire as defined in claim 3, in which the reduction in diameter of the tube by drawing through said die also causes reduction in diameter of the helix contained therein.

5. A method of manufacturing a cored wire as defined in claim 1, wherein the drawing is accomplished without reduction in diameter of the wires of the core and terminates when the helix is straightened.

6. A method of manufacturing a cored wire as defined in claim 5, in which the cored wire is subjected to further drawing to consolidate the core and make it thinner.

7. A method of manufacturing a cored wire as defined in claim 1, in which the core is formed from a composition of materials.

* * * * *